(12) United States Patent
Simms et al.

(10) Patent No.: US 7,913,279 B2
(45) Date of Patent: Mar. 22, 2011

(54) GLOBAL LISTINGS FORMAT (GLF) FOR MULTIMEDIA PROGRAMMING CONTENT AND ELECTRONIC PROGRAM GUIDE (EPG) INFORMATION

(75) Inventors: Andrew M. Simms, Fountain Hills, AZ (US); Samuel Thomas Scott, III, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 1574 days.

(21) Appl. No.: 10/356,694

(22) Filed: Jan. 31, 2003

(65) Prior Publication Data

US 2004/0154039 A1 Aug. 5, 2004

(51) Int. Cl.
G06F 3/00 (2006.01)
G06F 13/00 (2006.01)
H04N 5/445 (2011.01)
H04N 7/173 (2011.01)

(52) U.S. Cl. .............................. 725/39; 725/48; 725/50

(58) Field of Classification Search ..................... 725/39
See application file for complete search history.

(56) References Cited

U.S. PATENT DOCUMENTS

| | | | | |
|---|---|---|---|---|
| 4,890,321 A * | 12/1989 | Seth-Smith et al. | .......... | 380/231 |
| 5,576,755 A * | 11/1996 | Davis et al. | ...................... | 725/48 |
| 5,666,645 A * | 9/1997 | Thomas et al. | ................. | 725/47 |
| 6,002,394 A * | 12/1999 | Schein et al. | .................... | 725/39 |
| 6,040,829 A * | 3/2000 | Croy et al. | ..................... | 715/864 |
| 6,184,877 B1 | 2/2001 | Dodson et al. | | |
| 6,209,129 B1 * | 3/2001 | Carr et al. | ........................ | 725/42 |
| 6,401,242 B1 * | 6/2002 | Eyer et al. | ........................ | 725/35 |
| 6,442,755 B1 * | 8/2002 | Lemmons et al. | ............... | 725/47 |
| 7,073,193 B2 * | 7/2006 | Marsh | ........................... | 725/114 |
| 7,197,715 B1 * | 3/2007 | Valeria | ........................... | 715/747 |
| 7,213,256 B1 | 5/2007 | Kikinis | | |
| 7,536,705 B1 * | 5/2009 | Boucher et al. | ................ | 725/112 |
| 7,627,881 B1 * | 12/2009 | Gonno et al. | ................... | 725/39 |
| 7,712,113 B2 * | 5/2010 | Yoon et al. | ........................ | 725/9 |
| 2002/0038358 A1 * | 3/2002 | Sweatt et al. | ................ | 709/218 |
| 2002/0049971 A1 * | 4/2002 | Augenbraun et al. | .......... | 725/39 |
| 2002/0166120 A1 * | 11/2002 | Boylan et al. | ................... | 725/35 |
| 2002/0170060 A1 * | 11/2002 | Lyman | ............................ | 725/73 |
| 2002/0199204 A1 * | 12/2002 | Mory et al. | .................... | 725/113 |
| 2003/0004955 A1 * | 1/2003 | Cedola et al. | ................. | 707/100 |
| 2003/0028884 A1 * | 2/2003 | Swart et al. | ..................... | 725/51 |

(Continued)

FOREIGN PATENT DOCUMENTS

WO    WO 96/13935    5/1996

(Continued)

OTHER PUBLICATIONS

"XML Schema Part 0: Primer", W3C Proposed Recommendation, Mar. 30, 2001, XP-002305611, 64 pages.

(Continued)

*Primary Examiner* — Brian T Pendleton
*Assistant Examiner* — Jonathan Lewis
(74) *Attorney, Agent, or Firm* — Lee & Hayes, PLLC

(57) ABSTRACT

An exemplary global listings format (GLF) is metadata for electronically transferring multimedia programming content and electronic program guide information. The GLF metadata specifies a self-referential data structure having a self-consistency mechanism comprising interlocking and cross-locking data elements. The self-consistency mechanism ensures completeness and validity of transferred programming data. In one implementation, the exemplary GLF is expressed in an extensible markup language (XML) schema definition (XSD) specification.

12 Claims, 9 Drawing Sheets

U.S. PATENT DOCUMENTS

| | | |
|---|---|---|
| 2003/0165324 A1 | 9/2003 | O'Connor et al. |
| 2003/0233241 A1* | 12/2003 | Marsh ................................ 705/1 |
| 2003/0236708 A1* | 12/2003 | Marsh .............................. 705/26 |
| 2004/0001106 A1* | 1/2004 | Deutscher et al. ............ 345/838 |
| 2004/0117831 A1 | 6/2004 | Ellis et al. |
| 2004/0221310 A1 | 11/2004 | Herrington et al. |
| 2004/0221311 A1 | 11/2004 | Dow et al. |
| 2005/0188402 A1* | 8/2005 | de Andrade et al. ............ 725/46 |
| 2005/0235319 A1 | 10/2005 | Carpenter et al. |
| 2006/0064716 A1* | 3/2006 | Sull et al. ........................ 725/37 |
| 2007/0033533 A1* | 2/2007 | Sull ................................ 715/752 |
| 2007/0299685 A1* | 12/2007 | Marsh ................................ 705/1 |
| 2008/0115169 A1 | 5/2008 | Ellis et al. |
| 2008/0147650 A1* | 6/2008 | Marsh .............................. 707/5 |

FOREIGN PATENT DOCUMENTS

| | | |
|---|---|---|
| WO | WO9613935 A1 | 5/1996 |
| WO | WO 03/007596 | 1/2003 |

OTHER PUBLICATIONS

"XML schema mappings for heterogeneous database access", Collins et al., Information and Software Technology 44, 2002, pp. 251-257.

* cited by examiner

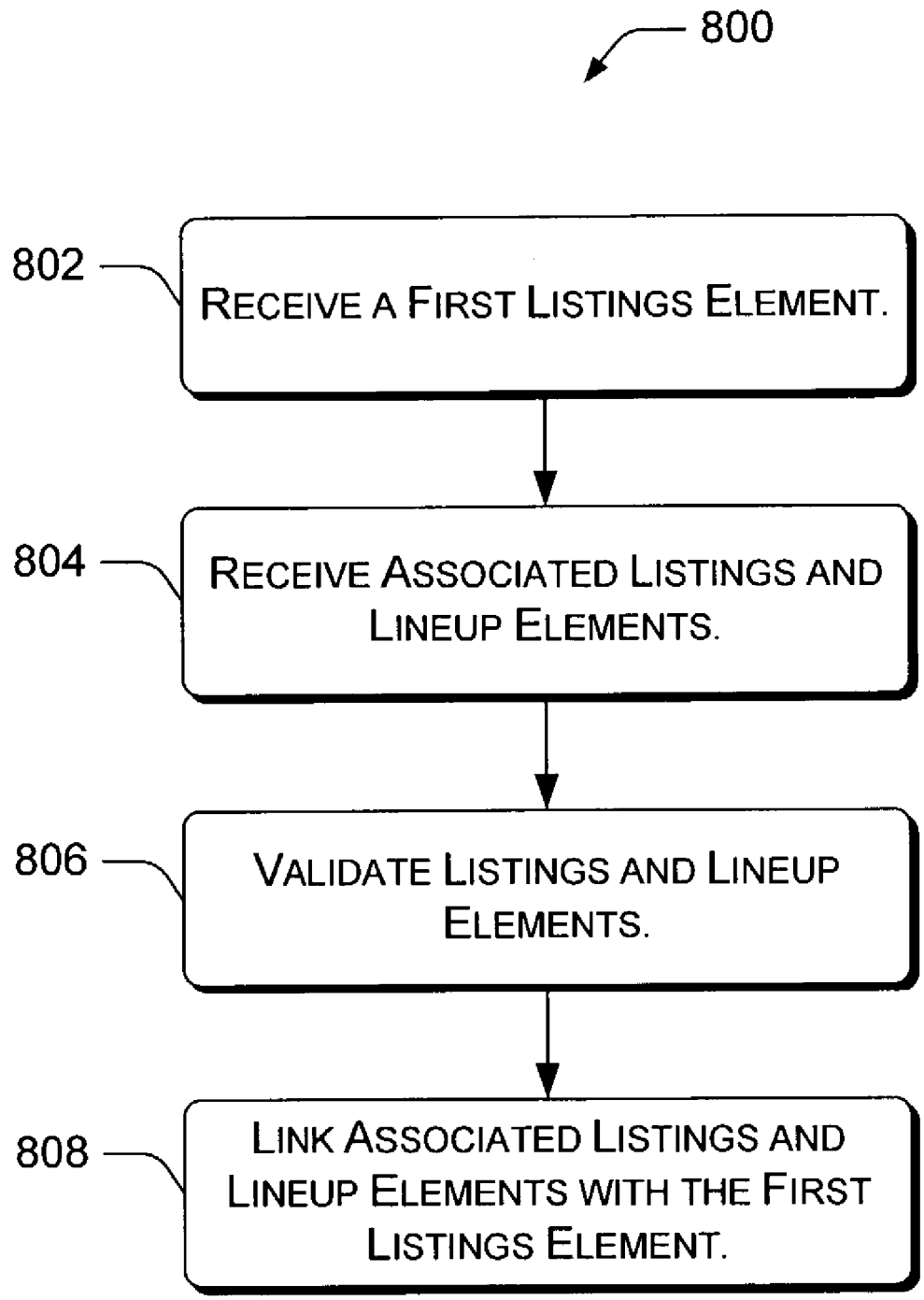

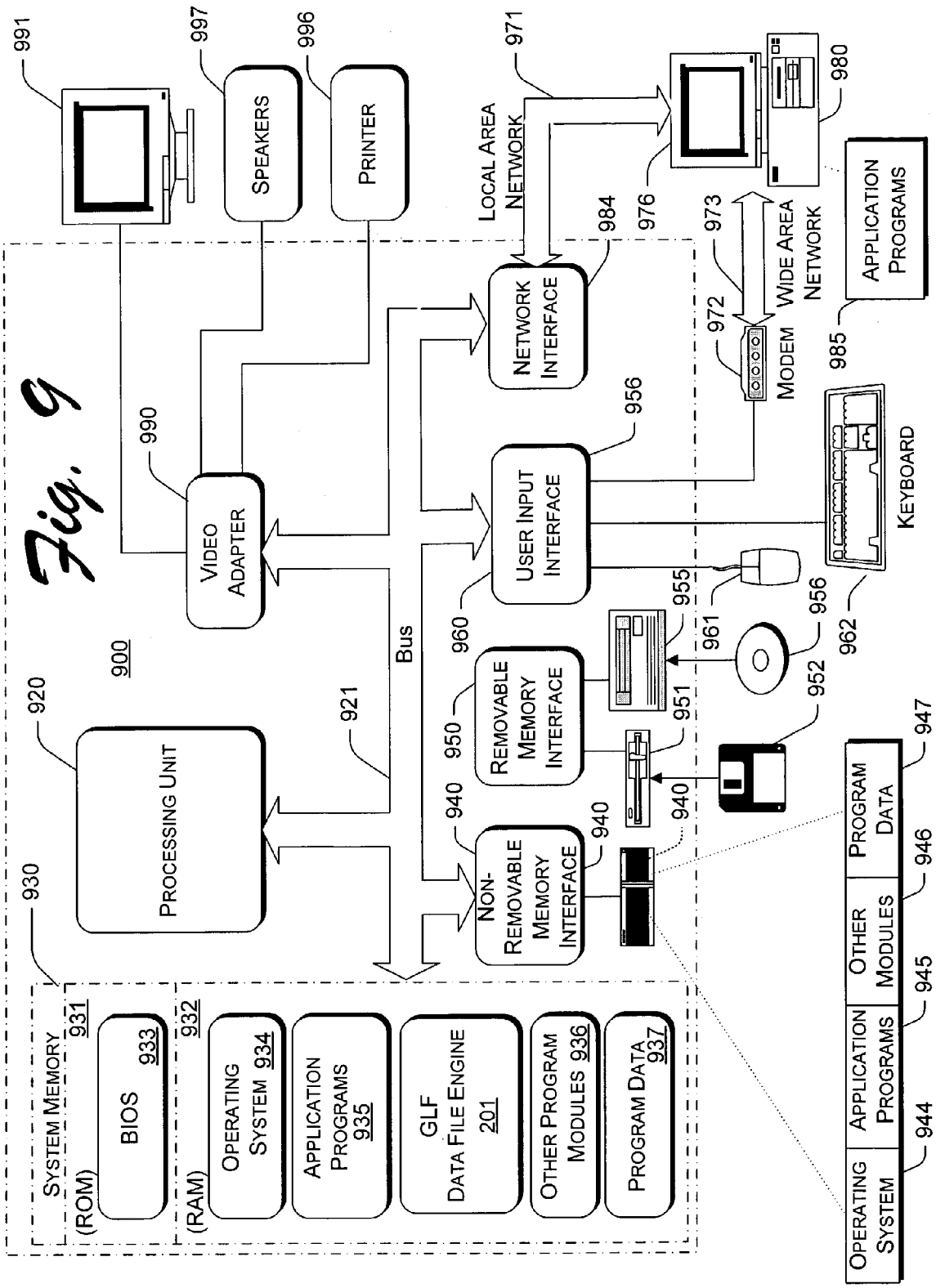

GLOBAL LISTINGS FORMAT (GLF) FOR MULTIMEDIA PROGRAMMING CONTENT AND ELECTRONIC PROGRAM GUIDE (EPG) INFORMATION

One set of XML text file listings used in accordance with the subject matter are provided in an appendix after the abstract on 7 sheets of paper and incorporated by reference into the specification. The XML text file listing is an exemplary sample global listings format data file.

TECHNICAL FIELD

This invention relates generally to multimedia data communications and specifically to a global listings format (GLF) for multimedia programming content and electronic program guide (EPG) information.

BACKGROUND

As computerized products for enjoying television and other multimedia forms expand across international markets, originators and distributors of multimedia programming known as Independent Data Providers (IDPs) have multiplied to provide programming content from many countries. Programming content usually consists of the program listings, which are transferred in a "data feed," that is, a "programming data file" that supplies local programming distributors with enough programming content to fill locally available channels for a specified duration, usually measured in days. The amount of programming data to be delivered by an IDP is usually defined in a listings data agreement.

Each IDP uses a proprietary listings format to create a programming data file that can be received and processed into local programming by a receiving entity. These proprietary listings formats are sometimes similar to each other but more often are different from each other and/or incompatible with each other, and more importantly, are incompatible with the receiving entity's needs. Specifically, the insertion of channel information needed to achieve a channel "lineup" that really works in a given locality for the supplied programming content is haphazard, due to the varying proprietary listings formats. In some instances the proprietary formats vary because collections of listings (i.e., programs and schedules) and lineups (i.e., sets of channels on which the programs and schedules will be implemented) are created by different types of IDPs. IDPs that produce listings usually predominate over the IDPs that produce lineups resulting in proprietary formats that favor listings information but neglect complete and accurate lineup information.

Additionally, the varying proprietary listings formats do not reliably convey information that has been translated across languages spoken in different countries. It is not always the translation itself that is problematic. A correct translation may be linked incorrectly to the wrong program number, for instance, or a new program number may be unnecessarily adopted because of the new language translation, resulting in a loss of referential consistency and, in this instance, a plethora of program numbers for one program.

FIG. 1 shows a conventional programming data file delivery environment 100, in which delivery proceeds from three example IDPs 102, 104, 106 to a receiving entity 108. IDPs typically select programming from a relatively unlimited universe of program listings 110 to create a programming data file that is marketed to the receiving entity 108, i.e., a local programming distributor, such as local broadcast station or a television cable company. The programming data files are characteristically large and therefore require, for example, approximately twenty hours of processing time to convert the data file into usable form.

In creating a programming data file, IDPs typically emphasize program listings 110 information, such as the names of movies and programs, to the exclusion or haphazard inclusion of supporting "lineup" logistical information that would be necessary to present programs at given times on specific channels available in the receiving entity's locale or catchment area. Although most IDPs add schedule information, attempts to include consistent and correct lineup information usually prove insufficient, as discussed above, especially when programming data files are transferred between different countries.

The blend of information formulated in a proprietary programming data file and the proprietary formats used may vary widely between IDPs. Thus, as shown in FIG. 1, a first IDP 102 uses a first proprietary data file format 112, a second IDP 104 uses a second proprietary data file format 114, and a third IDP 106 uses a third proprietary data file format 116. A receiving entity 108, such as a local programming distributor may even subscribe to several IDPs and must process programming data files from each into programming 109. Often, after spending, for example, twenty hours of processing time to convert a programming data file into usable programming 109, the receiving entity 108 discovers that one or more aspects of a proprietary format are not consistent 118. Perhaps channels listed in the programming data file do not exist 120 or do not exist in the local supplier's geographical and/or geopolitical area. Since the data file formats 112, 114, 116 from the various IDPs are arbitrary, data elements may be missing 122, the data may contradict itself 124, and/or the data may be present but may be unusable because incorrect and/or unrecognizable data types have been used 126. Because the data file is partially or completely defective, part or all of the processing time investment may be lost, and troubleshooting may be needed.

SUMMARY

Subject matter includes an exemplary global listings format (GLF) for electronically transferring multimedia programming content and electronic program guide (EPG) information. The GLF can be a type of metadata that specifies a data structure having a self-consistency mechanism comprising linked, that is, interlocking and crosslocking, data elements. The self-consistency mechanism ensures consistency, completeness, and validity of a multimedia programming data file to be electronically transferred.

In one implementation, the exemplary GLF is cast in an extensible markup language (XML) schema definition (XSD) specification and IDPs are supplied with a set of editorial instructions as a guide for producing and delivering programming data. A receiving entity having XML database (XDB) capabilities can import the GLF standardized programming data file for producing substantially complete and error-free programming for a variety of clients, using standard XML tools and resources. The strong data typing inherent in XML provides one aspect of GLF data validation.

An exemplary GLF standardizes key relationships in programming data, particularly relationships between listings data and lineup data. Various implementations of the GLF have sufficient richness and versatility to accommodate listings and lineups for programming content and EPG guide information that can be used in many types of multimedia products. Exemplary GLFs are expandable and extensible to accommodate detailed attributes related to the listings and the lineups.

BRIEF DESCRIPTION OF THE DRAWINGS

FIG. 8 is a flow diagram of an exemplary method for producing a GLF programming data file.

FIG. 9 is a block diagram of an exemplary computing device environment in which to practice the subject matter.

DETAILED DESCRIPTION

Overview

Figure 1:
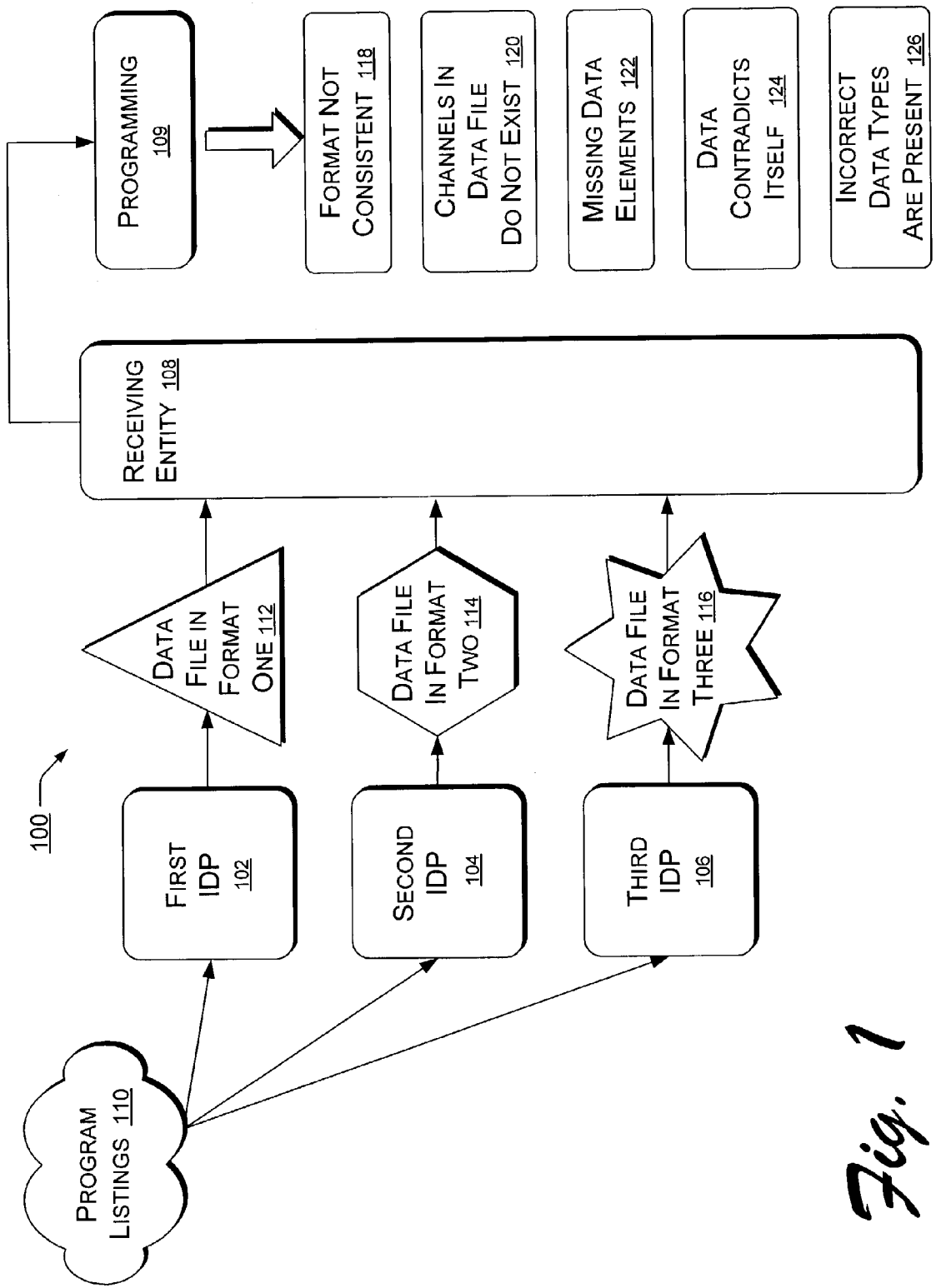
FIG. 1 is a block diagram of a conventional environment in which programming data files are transferred.

It is rather frustrating to invest perhaps twenty hours of processing time to decode a programming data file 112, 114, 116 into usable form, only to find that channels listed in the data do not really exist, that a foreign language translation is attached to the wrong program, or that the same program has multiple unique ID numbers.

Exemplary subject matter includes a global listings format (GLF) and related methods and data structures for electronically transferring programming content and electronic programming guide (EPG) information, for example, from an IDP to a local distributor client, or between countries in which different languages are spoken. The GLF for multimedia programming content and EPG information also forms a consistent foundation for operating systems that support multimedia processing, such as Windows XP Media Center Edition (Microsoft Corporation, Redmond, Wash.).

A listings element may be any data or information related to programming content or to the scheduling thereof. A lineup element may be any data or information related to sets of channels on which the programming content and scheduling will be implemented. The exemplary GLF can be thought of as metadata for consistently structuring the listings and lineup information. Insofar as the listings and lineup information is itself metadata about the programming content, the exemplary GLF is arrangement metadata for the listings and lineup metadata. The GLF metadata aims to provide consistently comprehensive and correct programming information, so that a given local distributor receiving a GLF programming data file has all the information at hand that might be needed to provide programming and EPG information in any degree of desired detail. Since the GLF metadata specifies a consistent listings format, whoever uses the GLF metadata can realize the downstream benefits of consistency, completeness, and correctness of the programming data.

Receiving a GLF programming data file, the local distributor may be freed from the tedious tasks of error correction and gathering of additional information.

In other words, the exemplary GLF has a self-referential structure and built-in self-consistency mechanism that includes various interlocking mechanisms that establish and enforce completeness and validity of the programming information. Each data element included in a GLF data structure is referred to, so that there are no "left-over," unidentified, or unaccounted for data elements. If completeness is not satisfied, then various specific actions may follow. The various interlocking mechanisms not only detect that a data file is invalid, but can also report on what specifically is incorrect. An error can be logged and a full description of the error sent to the IDP. Since the IDP can also be in possession of the GLF, the IDP can validate their GLF data file before sending it to the local distributor.

The self-referential structure of an exemplary GLF has interlocking and crosslocking (collectively: "linked") fields and/or data elements that create a data structure wherein important or desirable programming information is not forgotten or inserted incorrectly during programming data file creation. The term "crosslocking" is used for establishing linkages between listings and lineup data. This distinguishes "crosslocking" from "interlocking," which refers to links between two listings data elements or between two lineup data elements.

In one implementation, the exemplary GLF is cast in an extensible markup language (XML) schema definition (XSD) specification and IDPs are supplied with a set of editorial instructions as a guide for producing and delivering programming data. A receiving entity 108 having XML database (XDB) capabilities can import the GLF standardized programming data file for producing substantially complete and error-free programming for a variety of clients, using standard XML tools and resources.

An exemplary GLF standardizes key relationships in programming data, particularly relationships between listings data and lineup data. "Listings" is a term used to include program and schedule information, for example, the program title, unique program ID, episode title, episode number, description, year of creation, cast, acting roles, crew, ratings, category, length, start time, frequency, etc. "Lineup" is a term used for channeling data, such as channels available in a given area, for example on cable, over-the-air, and satellite services. Thus, lineup data is used to partition the set of all available channels into a smaller set that is relevant to a given receiving entity 108 in a particular locale.

Implementations of the GLF have sufficient richness and versatility to accommodate listings and lineups for many types of multimedia products. Exemplary GLFs are expandable and extensible to accommodate detailed attributes about the listings and the lineups.

Programming Data File Transfer Environment

Figure 2:
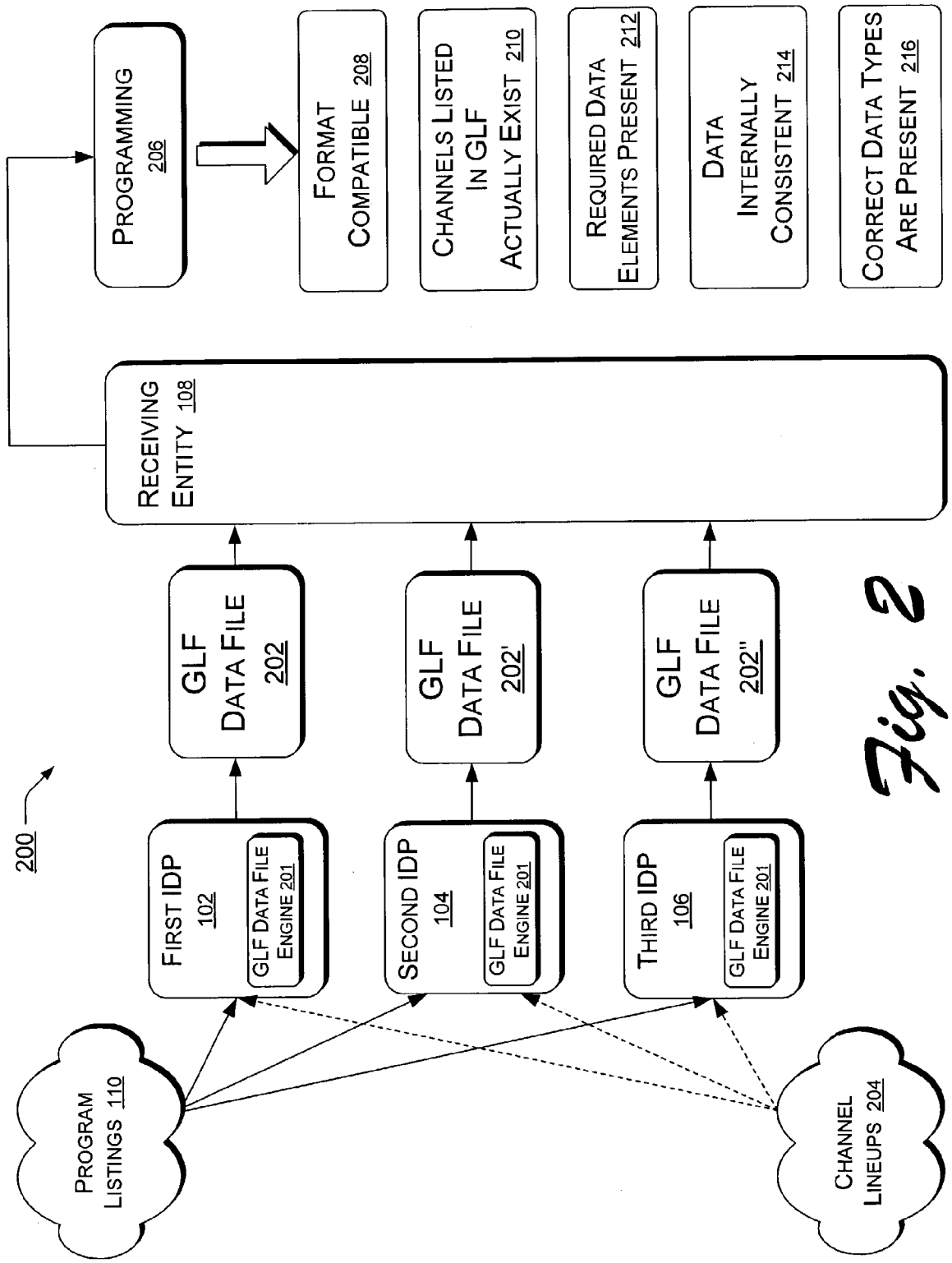
FIG. 2 is a block diagram of an exemplary environment in which global listings format (GLF) programming data files are transferred.

FIG. 2 shows a programming data file delivery environment 200, in which delivery proceeds from the three example IDPs 102, 104, 106 to the receiving entity 108 using exemplary GLF data files 202, 202', 202". Example IDPs 102, 104, 106 each having an exemplary GLF data file engine 201, select programming content from a relatively unlimited universe of program listings 110 to create a data file(s) that can be electronically transferred to a receiving entity 108, such as a local programming distributor. Each exemplary GLF data file engine 201 contains or has access to GLF metadata for creating a GLF data file 202 in an exemplary GLF format. In each exemplary GLF data file 202, 202', 202" the programming data is structured so that each selected element from the program listings 110 to be transferred is accompanied, if appropriate, by one or more elements from a universe of channel lineups 204. The various listings elements and lineup elements are interlocked and crosslocked, where appropriate, to provide an exemplary GLF data structure, including a self-consistency mechanism (i.e., the self-referential interlocks and crosslocks to be discussed more fully below). Thus, an exemplary GLF data file 202 formatted according to exemplary GLF metadata has substantially complete and error-free programming information regardless of which IDP 102, 104, 106 creates the programming data file.

The self-consistency mechanism(s) imbued in exemplary GLF data structures ensure substantially complete and error-free programming information, and are especially useful when the programming data is being transferred between international sources. Built-in language translation fields can optionally be used to ensure that language translations are inserted into or interlocked with the proper data elements. The receiving entity 108 processes each received GLF data file 202 to obtain programming 109 that is true to an expected format (208), that is, the usable programming 109 conforms to GLF standards of completeness and validity. Further, channels listed in a GLF data file 202 actually exist in the receiving entity's location 210. The exemplary GLF data structure also assures data completeness and integrity, namely, that required data elements are present 212 (e.g., if a program listing is supplied, then lineup information is also supplied), that the data is internally consistent 214 (i.e., no contradictions are present), and that correct data types have been applied to each data element supplied 216.

Exemplary GLF System Components

Figure 3:
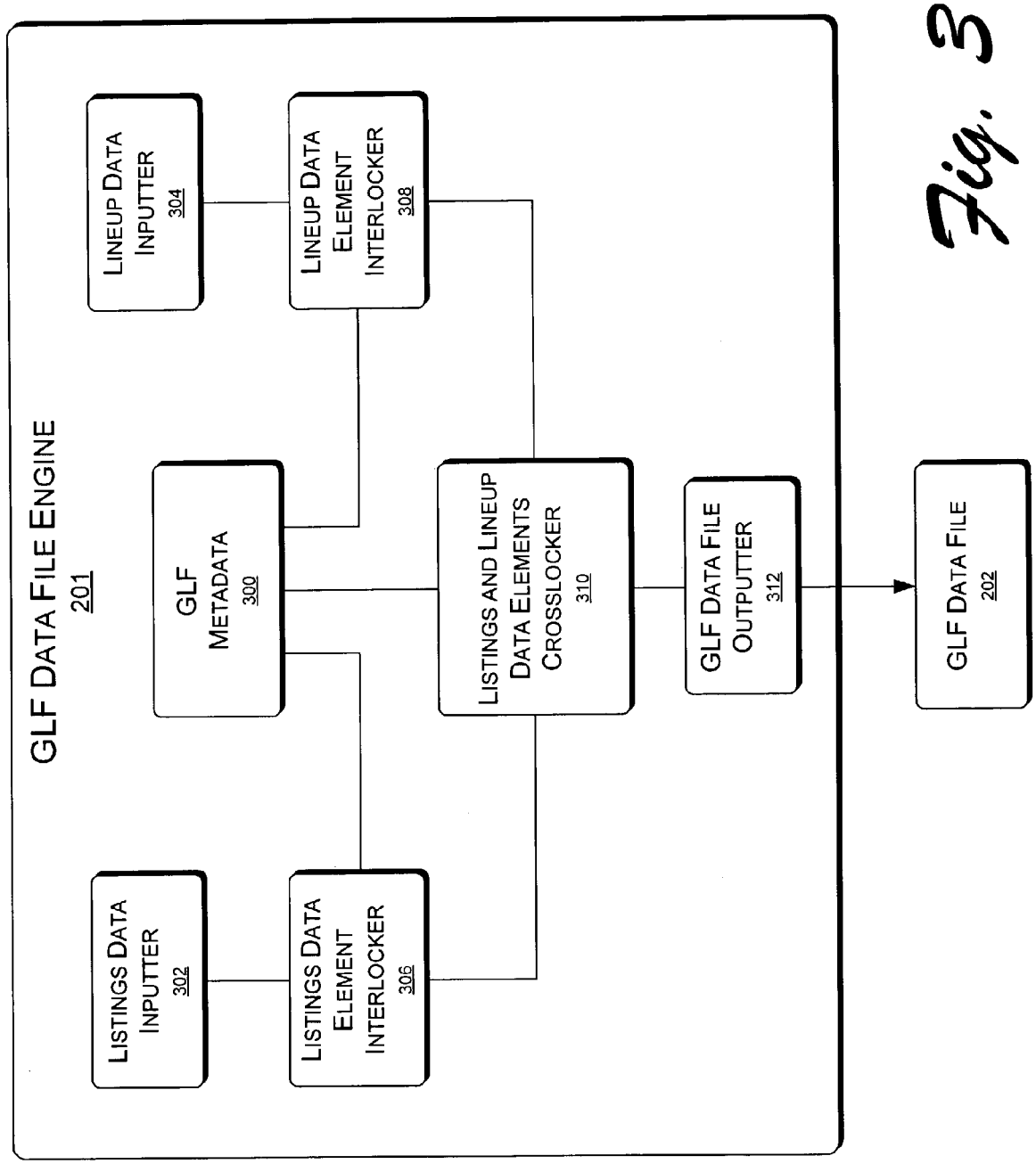
FIG. 3 is a block diagram of an exemplary GLF data file engine.

FIG. 3 shows the exemplary GLF data file engine 201 of FIG. 2 in greater detail. Of course, other means, such as other engines, routines, rules, etc. can yield an exemplary GLF data structure result. The exemplary GLF data file engine 201 uses GLF metadata 300 to link data elements and attributes into the GLF data structure that comprises at least part of a GLF data file 202. In one implementation, a listings data inputter 302 and a lineup data inputter 304 are communicatively coupled with a listings data element interlocker 306 and a lineup data element interlocker 308, respectively. The listings data element interlocker 306 and the lineup data element interlocker 308 are communicatively coupled with a listings and lineup data elements crosslocker 310. The two interlockers 306, 308 and the crosslocker 310 are communicatively coupled with and/or have access to the GLF metadata 300. A GLF data file outputter 312 produces a GLF data file 202 or a combination of GLF data file component files that can be processed by a receiving entity (108 of FIG. 2) into usable programming 109. The GLF data file outputter 312 may also perform validation of interlocked and crosslocked elements and attributes, including data type validation. The inputters 302, 304 may also perform the validation of data that is input into the exemplary GLF data file engine 201.

The purpose of the interlockers 306, 308 and the crosslocker 310 is to provide completeness and validity to the GLF data file 202 or, in other words, to create a data structure in which expected data elements and attributes for each program are present, complete, and in proper form. The format for providing this completeness and validity is supplied by the GLF metadata 300. In some implementations of the subject matter, the GLF metadata 300 is a set of rules, a set of tags, one or more templates, and/or one or more markup language schemas for gathering complete information about a program, particularly complete associated lineup information. Specifically, the GLF metadata 300 aims to effect construction of valid channel definitions for a given geographical or geopolitical area where the program will be "broadcast." When the listings data inputter 302 is presented with a program title or unique ID number, therefore, the listings data element interlocker 306 may link other required fields to the prospective program and prompt the listings data inputter 302 and the lineup data inputter 304 to "fill in the blanks" presented by these other required fields before the GLF data file 202 can be considered valid (e.g., pass validity tests, etc.). These consistent and strictly enforced metadata rules with their insistence on completeness enable the GLF data file engine 201 to avoid haphazard insertion of lineup data, which causes incorrect presentation of information, program corruption, and frozen systems.

In some implementations, the GLF metadata 300 takes the form of markup information in a language vehicle, such as extensible markup language (XML). In the case of XML, the elements and attributes of the markup language may be logically linked, for example, by key and keyref constraints that establish and enforce GLF completeness and validity.

It should be noted that if a markup language such as XML is selected as the vehicle for an exemplary GLF, then the GLF data file 202 may validate against one or more GLF.xsd files, as will be discussed more fully below. Also, when the GLF is cast in such a markup language, then all the tools and resources associated with the language may be used to conveniently form and validate GLF data structures and data types.

The listings data element interlocker 306 links listings data elements and attributes with other listings data elements and attributes. For example, if a listings data element is the program name, e.g., and episode of "Star Trek," then the listings data element interlocker 306 may require a second listings data element, such as the duration of the Star Trek episode, to be supplied to the GLF data file engine 201 and correctly entered as content in a listings data element.

Likewise, the lineup data element interlocker 308 links lineup data elements and attributes with other lineup data elements and attributes. For example, if a lineup data element is a geographical area, e.g., a postal zip code area in San Jose, Calif., then the lineup data element interlocker 308 may require a second lineup data element, such as the name of a headend available in the given zip code area, to be supplied to the GLF data file engine 201 and correctly entered as content into a lineup data element.

The listings and lineup data elements crosslocker 310 links a listings data element or attribute with one or more lineup data elements or attributes. For example, a unit of schedule information (a listings datum) may be relevant only with regard to a certain channel (a lineup datum). The crosslocker 310 requires the channel lineup datum to be supplied and correctly entered once the unit of schedule listings datum is present. Since the crosslocker 310 as well as the interlockers 306, 308 establish and strictly enforce the GLF described by the GLF metadata 300, an entire GLF data file 202 (or set of GLF data files) contains consistently applied interlocks and crosslocks providing programming information that is complete and valid for an intended geographical or geopolitical area in which specific language(s) are spoken and in which only some channels but not others are available.

Figure 4:
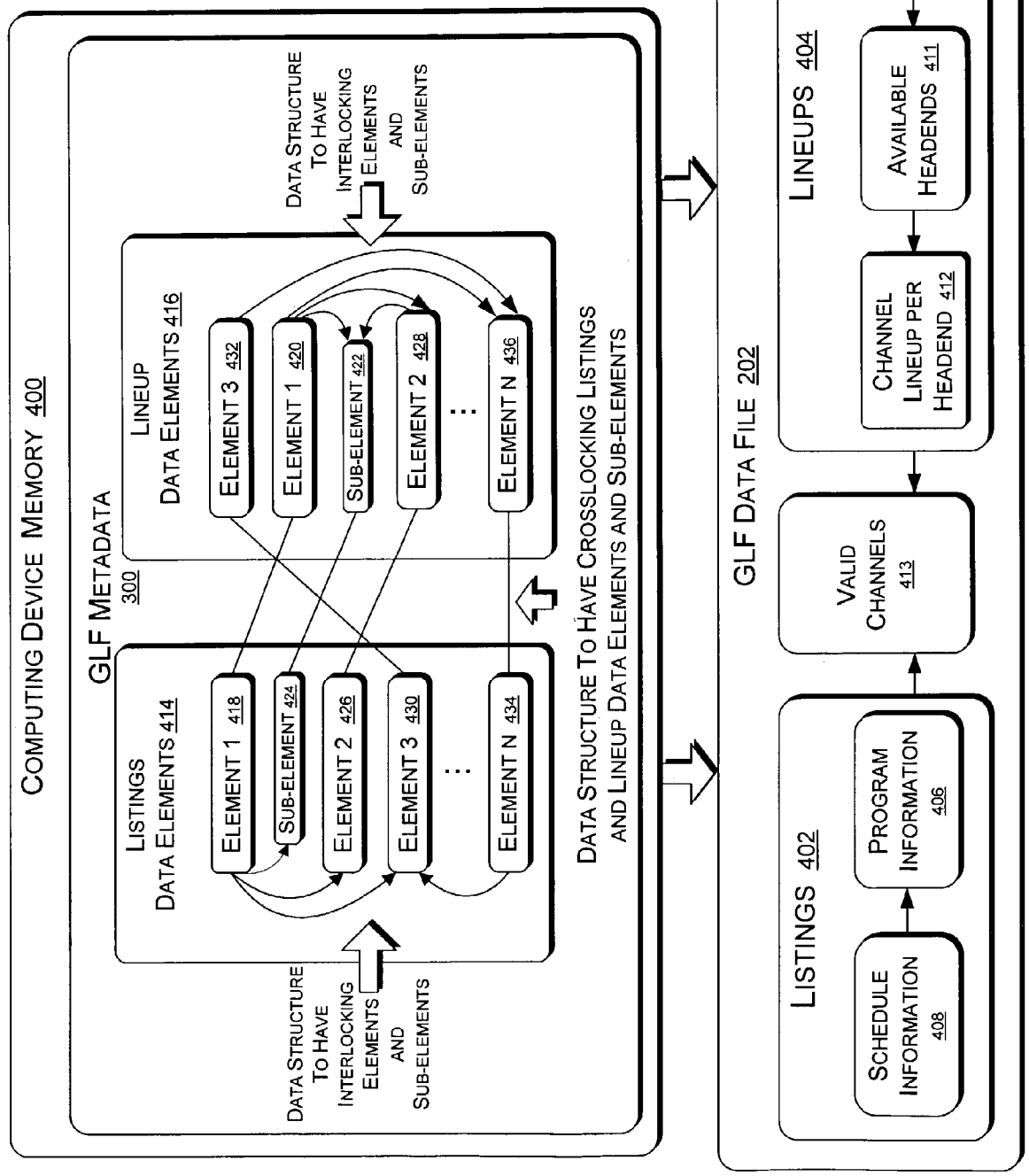
FIG. 4 is a graphic representation showing formation of an exemplary GLF data file using exemplary GLF metadata residing as a data structure in the memory of a computing device.

FIG. 4 shows formation of an exemplary GLF data file 202 in which listings 402 and lineups 404 are formed from GLF metadata 300 residing as a data structure in a computing device memory 400. A computing device having memory 400 and suitable as an environment for practicing the subject matter will be described in detail in relation to FIG. 9 below. In the implementation illustrated in FIG. 4, listings 402 may contain subcategories of program information 406 and schedule information 408. Lineups 404, in this implementation, may contain subcategories of areas 410 (location information), headends 411, and channel lineup(s) 412 (per headend). Headends define a set of channels available at one source, such as channels on a particular cable service. Examples of headends are: a DirecTV national feed, over-the-air channels for a specific area, and channel offerings of a cable company. Channel lineups (per headend) form the relation between headends and channels. Areas refer to a geographical or geopolitical region in which certain headends exist.

The presence of both the listings 402 and lineups 404 allow the creation of valid channels 413 for stated locations. Incoming data to be formatted according to the exemplary GLF metadata 300 may be selected or formed from listings 402, lineups 404, and/or any of the subcategories 406, 408, 410, 411, 412.

Within an exemplary GLF data structure, listings data 414 are crosslocked with lineup data 416, that is, linkages are comprehensively established between fields for listings data elements and relevant and/or supporting fields for lineup data elements. Furthermore, the fields for the elements and sub-elements within the listings data 414 may be interlocked with each other, in addition to being crosslocked with the fields for the elements and sub-elements of the lineup data 416. Likewise, within the lineup data 416, fields for elements and sub-elements may be interlocked with each other, as well as crosslocked with fields for the elements and sub-elements of the listings data 414.

For example, if the listings data "element 1" 418 is a television episode, for example "Star Trek," then this episode may only be available via a satellite programming distributor, and so the listings data "element 1" 418 is crosslocked with lineup data "element 1" 420, in this case representing the satellite programming distributor. Lineup data "element 1," in turn, is interlocked to a lineup data sub-element 422 that represents, for example, the specific channel on which the Star Trek episode will be broadcast via satellite. Likewise, returning to listings data "element 1" 418, the Star Trek episode is interlocked with a listings data sub-element 424 that represents the time of day that the Star Trek episode will be broadcast. The particular illustrated implementation of interlocking and crosslocking fields for data elements is only meant to illustrate subject matter, in other exemplary GLFs the interlocking and crosslocking may vary.

As information is added, interlocking and crosslocking linkages between fields for data elements are applied throughout the growth of an exemplary GLF data structure as specified by the exemplary GLF metadata 300. Thus, for example, listings data "element 2" 426 is crosslocked with lineup data "element 2" 428 and interlocked with listings data "element 1" 418; listings data "element 3" 430 is crosslocked with lineup data "element 3" 432 and interlocked with listings data "element 1" 418 and listings data "element N" 434; and listings data "element N" 434 is crosslocked with lineup data "element N" 436 and interlocked with listings data "element 3" 430. Likewise, fields for the lineup data elements and sub-elements may be interlocked with each other, in addition to being crosslocked with the listings data elements.

Figure 5:
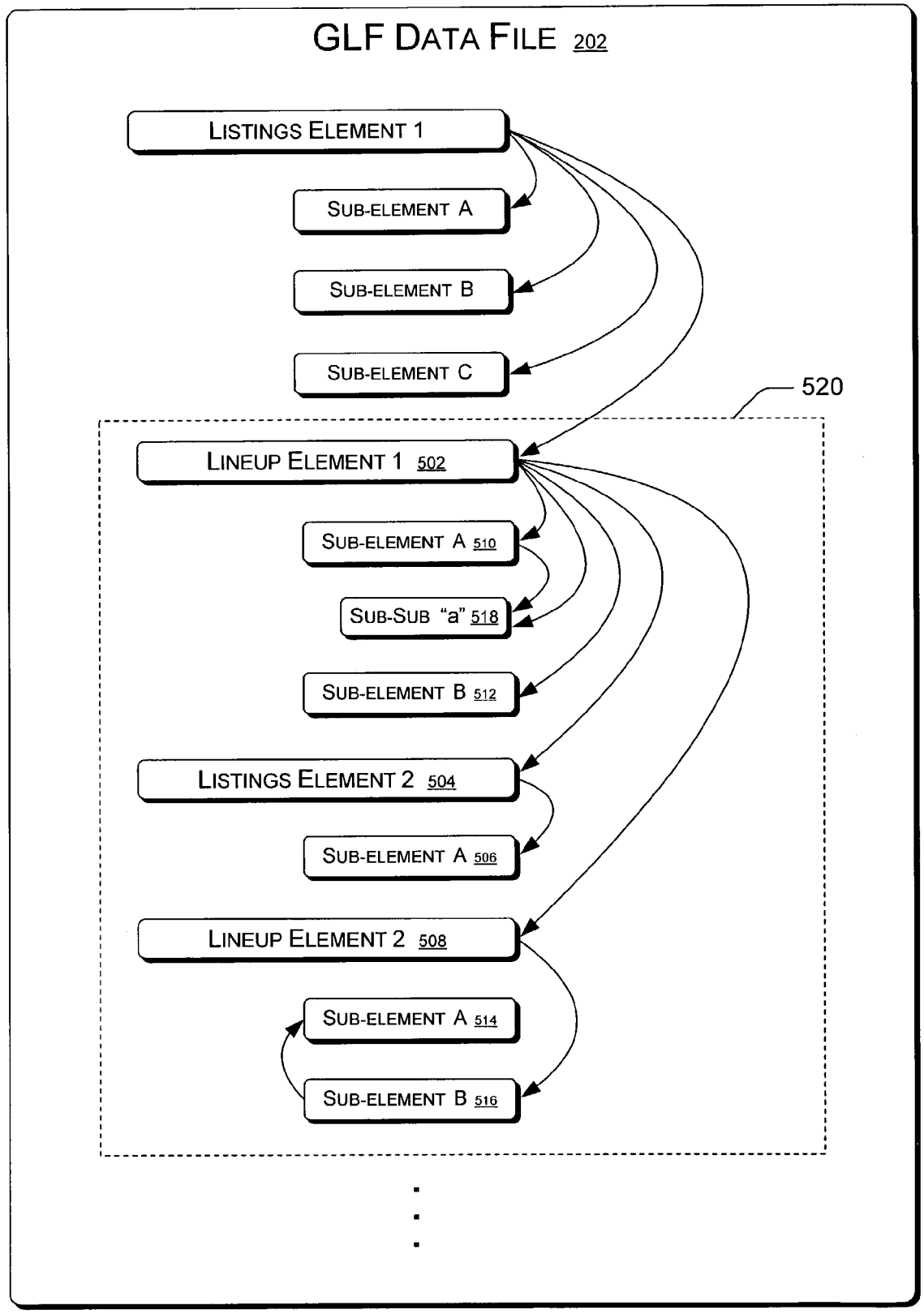
FIG. 5 is a graphic representation showing formation of an exemplary GLF data structure in an exemplary GLF data file.

FIG. 5 shows one implementation of a data structure in an exemplary GLF data file 202 in which the crosslocked and interlocked linkages between fields for data elements include "required field" logical relationships. If a first data element is present, such as the illustrated lineup "element 1" 502 then data fields linked to lineup "element 1" 502 must also be included and supplied with correctly entered data in order for a data file being created to be valid. "Required fields" linked to lineup "element 1" 502 may include listings elements, such as listings "element 2" 504; listings sub-elements, such as "sub-element A" 506; other lineup elements, such as lineup "element 2" 508; and/or lineup sub-elements, such as sub-elements 510, 512, 514, 516 and sub-sub-element 518, etc. Thus, because the data structure of the exemplary GLF 202 comprises at least some interlocking fields, various sections of the exemplary GLF 202 data structure will be present or absent in an "all-or-nothing" manner. When lineup "element 1" 502 is added to the GLF 202 data structure then data structure section 520 must also be present in its entirety, in this implementation. An IDP creating the GLF data file 202 may be prompted to add information to complete the data structure section 520 that accompanies or surrounds a new data element, such as lineup "element 1" 502.

Exemplary XSD Implementation of the GLF

As mentioned above, in one implementation the exemplary GLF metadata 300 includes an XML schema definition (XSD) specification and a set of editorial instructions. A data file whose structure conforms to the GLF.xsd schema offers many features, which will now be described. In XML, data is hierarchically structured. This hierarchical structure is an excellent vehicle for programming content and EPG information, which is also hierarchically structured. An exemplary data file conforming to the GLF.xsd schema facilitates correct generation of data files that a receiving entity 108 having XML database (XDB) capability can import and process to obtain consistent, standardized, reliably complete, and substantially error-free programming data 109. For example, the programming data 109 is complete relative to schedule information 408 because the GLF.xsd schema directs that schedule data represent a contiguous block of time, wherein all channels that are included exist in the relevant geographical or geopolitical area and are supplied with programming for the entire time range included in the data file, with no gaps.

An exemplary GLF data file 202 conforming to the GLF.xsd schema requires no additional import work or query tuning and has a rich enough structure to encode currently known programming attributes as well as new attributes as they arise. Further, the GLF.xsd schema is designed to handle international listing data (i.e., in various languages) via XML's XSD facilities. The GLF.xsd schema is also operating system independent: however, XML and XSD validation may be required in some implementations.

In an exemplary GLF.xsd schema data structure, basic listings relationships are expressed according to strict form. Strict validation is provided to ensure correct data generation and delivery. Although strict form is used, the GLF.xsd schema is relatively compact and efficient, but not to the point where data generation and data validation suffer. A receiving entity 108 using an exemplary GLF schema parses and validates XML documents against world wide web consortium (W3C) XSD compliant schemas. Use of Microsoft's XML 4 (MSXML4) is recommended in some implementations (Microsoft Corporation, Redmond, Wash.). The exemplary GLF.xsd schema enforces referential integrity constraints and required fields on the underlying data and defines additional structure for features that may not be supported by every IDP but must still be rigorously defined. GLF data files 202 conforming to an exemplary GLF.xsd schema may be stored in more than one programming data file to facilitate electronic transfer.

Figure 6:
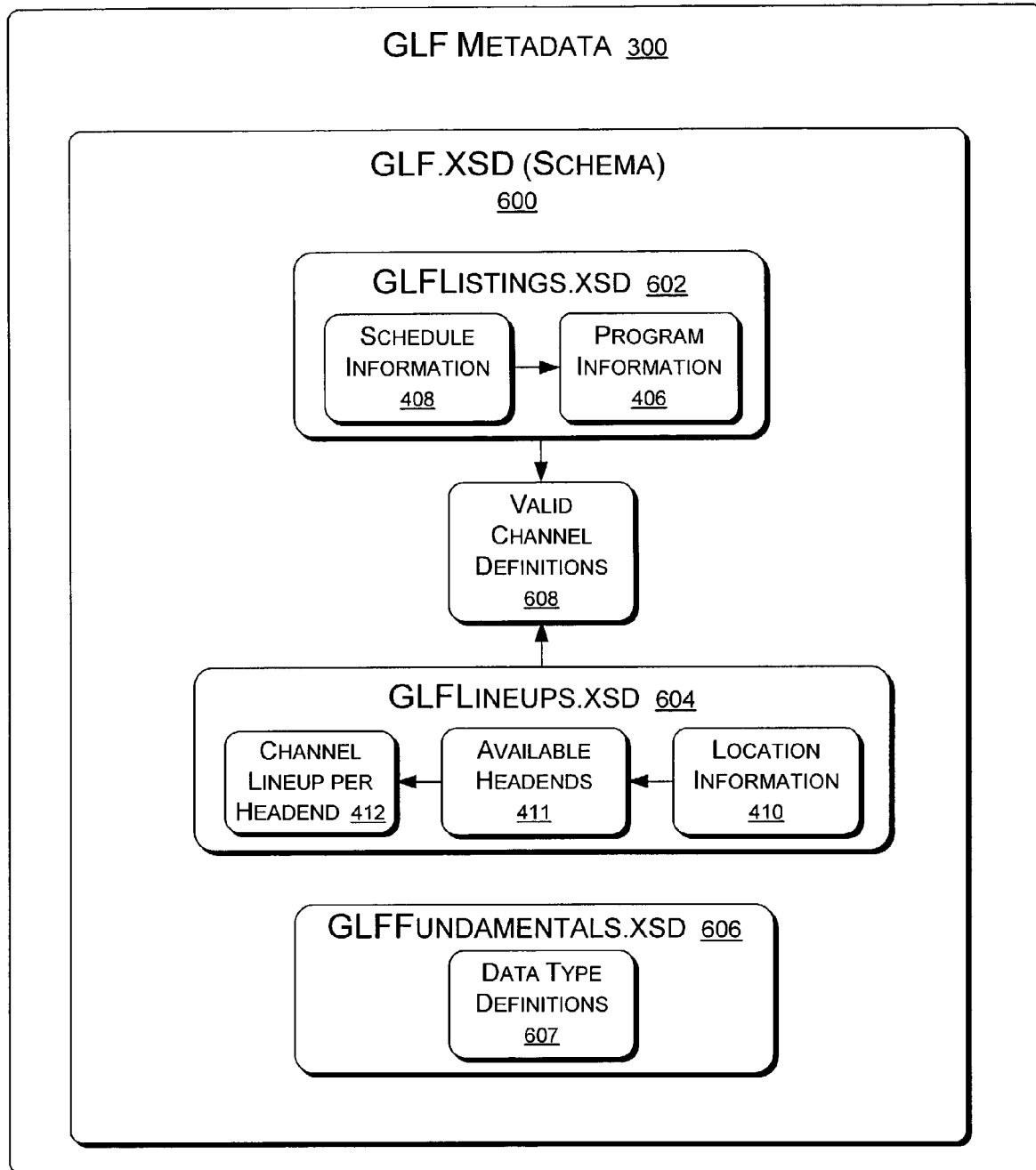
FIG. 6 is a block diagram of a GLF.xsd schema and components.

FIG. 6 shows exemplary GLF metadata 300, which includes and/or comprises an exemplary GLF.xsd schema 600. The illustrated exemplary GLF.xsd schema 600 is an aggregate that can be broken up into components: a GLFListings.xsd component 602, a GLFLineups.xsd component 604, and a GLFFundamentals.xsd component 606.

The GLFFundamentals.xsd component 606 contains basic data type definitions 607 used in the aggregate GLF.xsd schema 600. The GLFListings.xsd component 602 defines the portion of the data related to listings 402, and the GLFLineups.xsd component 604 defines the portion of the data related to lineups 404. The GLFListings.xsd component 602 and the GLFLineups.xsd component 604 are joined by a common data entity, channels, i.e., valid channel definitions 608.

In one implementation, the GLFListings.xsd component 602, the GLFLineups.xsd component 604, and the GLFFundamentals.xsd component 606 can be used as separate modules. Because listings and lineups are often produced by different groups of people, that is, different types of IDPs, the division of the aggregate GLF.xsd schema 600 into a GLFListings.xsd component 602 and a GLFLineups.xsd component 604 may be useful in allowing data files conforming to the components 602, 604 of an aggregate GLF.xsd schema 600 to be produced in different places, by different entities, and/or at different times, and then combined later by the receiving entity 108 to form the aggregate programming data file conforming to the GLF.xsd schema 600. This is possible because the GLF data structure is consistent and the component parts intra-compatible regardless of where the component piece originate. An IDP that provides only listings information may use only the GLFListings.xsd component 602 (and the GLFFundamentals.xsd component 606 from which definitions are imported). Likewise, an IDP that provides only lineup information may use only the GLFListings.xsd component 604 (and the GLFFundamentals.xsd component 606).

The various .xsd schema definition file components 602, 604, 606 are self-contained, i.e., they do not need to refer to outside files for schema definition. Thus, the aggregate GLF.xsd schema 600 can combine listings, lineup, channel definition, and data type definition components into a single file representation suitable for electronic transfer or alternatively, as discussed above, the components 602, 604, 606 can be electronically transferred independently as separate files.

Referential Structure of an Exemplary XSD Implementation of GLF

In one exemplary XSD implementation, the GLF metadata 300 defines three basic entities with primary keys (also called primary "IDs"). These are "program," i.e., the definition of television programming, including fields such as title and description; "channel," i.e., the definition of television programming source, e.g. a broadcaster; and "headend," i.e., the definition of a group of television programming sources. Program, channel, and headend keys (or IDs) are intended to be persisted indefinitely for each IDP 102, 104, 106 and not reused, i.e., each provider is responsible for managing their own ID space. This helps to ensure consistency across language translation, and prevents multiplication of IDs for a single program. Such consistency is important for capabilities such as automatic recording of programs. If a program has already been recorded, it would not be desirable to record it again because an additional program ID number has been unnecessarily generated.

The three basic entities defined above are further related by three additional entities that tie the data together. These are "schedule," i.e., the definition of the program start time and duration on a channel; "lineup," i.e., the definition of sets of channels associated with a specific headend; and "areas," i.e., the definition of headend mapping according to locale, for example by postal code.

The structured relationships between the three primary entities and the three additional entities comprise metadata for the GLF self-consistency mechanism. The self-consistency metadata expressed as a referential structure establishes and enforces referential integrity of data between the three primary entities and the three additional entities by means of key and keyref constraints placed at appropriate levels in the XSD. These constraints ensure that all data elements referenced in a relational element (e.g. a schedule element) must be present in the programming data file or the file will not be considered valid.

A representation of an exemplary XML programming data file conforming to the GLF.xsd schema 600 appears in Appendix A: "Exemplary GLF Data File Sample Which Conforms to the GLF Specification." This representation contains only an abbreviated selection of elements, attributes, and corresponding values. Accordingly, a typical GLF data file 202 conforming to the GLF.xsd schema 600 can contain more entries than those shown, and/or different elements, attributes and/or corresponding values.

Expandability of the Exemplary XSD Implementation of the GLF

The self-referential data structure imparted by an exemplary GLF.xsd schema 600 is expandable with regard to both listings and lineups. In an exemplary GLF.xsd schema 600, listings 602 may consist of program information 406 and schedule information 408, as discussed above with reference to FIG. 4.

Figure 7:
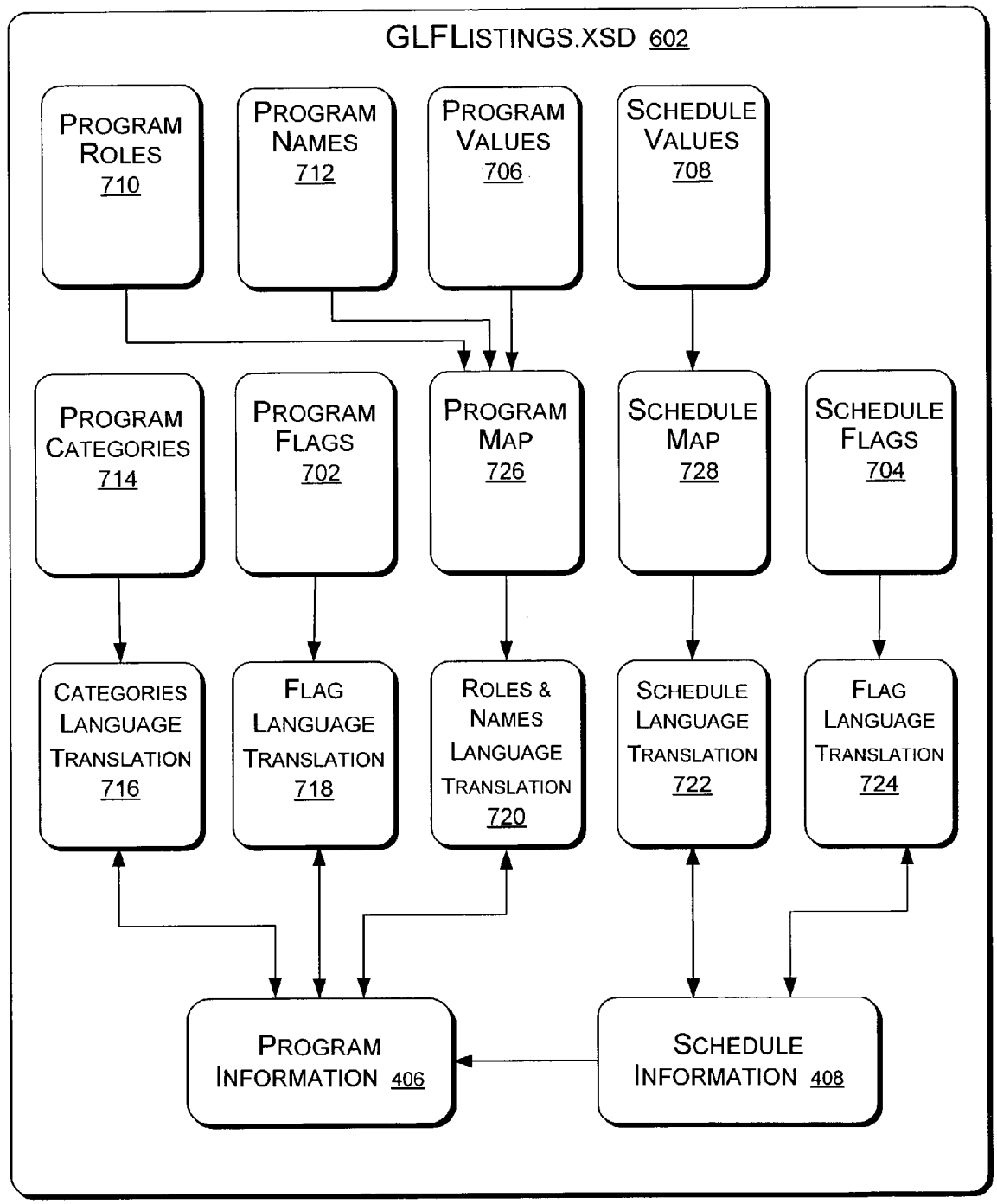
FIG. 7 is a block diagram of an exemplary GLFListings.xsd schema component.

FIG. 7 shows another implementation of an exemplary GLFListings.xsd component 602 in which the structure of program information 406 can be enriched by linking optional sub-elements and/or attributes, such as program flags 702, schedule flags 704, program values 706, schedule values 708, program roles 710, program names 712, program categories 714, and various language translations 716, 718, 720, 722, 724.

A flag 702 is a Boolean mechanism used to express general attributes of a program when the domain of possible values that the attribute can assume is small, e.g., television ratings, such as MPAA and Star ratings in the United States, can be represented by a small set of flags corresponding to each possible value.

The program values 706 and schedule values 708 are general-purpose key-value mechanisms used to express attributes of a program or schedule when the domain of possible values that the attribute can assume is relatively large, e.g., a program's year of release, or a schedule attribute of "primetime Monday." The extensibility of key-value pairs is applicable for both program and schedule types. Any number of key-value pairs may be assigned to a program information entry (406) or a schedule information entry (408). The schedule values 708 are similar to the program values 706 except that they are for specific airings of a program, e.g., "sponsored by" and "company name."

Program roles 710 and program names 712 associate cast, crewmembers, and some functions with a program. For example, the names of the writer, producer, and director may be stored in roles as well as casting information, such as "William Shatner as Captain James T. Kirk." Optionally, an explicit attribute for ordering the names and roles is also included. There may also be optional provisions for supporting multiple translations of roles for presentation. Program roles 710 are expressed in this manner to provide strict schema validation and to provide a compact representation without arbitrary restrictions on the number of program roles 710 associated with a program or person. A program map 726 and/or a schedule map 728 may be included in the GLF structure to link program roles 710 and program names 712 to the various program information (406) data elements, such as program ID.

Program categories 714 are a set of references to a hierarchical category structure used to group related programs. For example, it may be useful to categorize all news programs, all sports programs etc. for EPG menuing. Program categories 714 are important attributes for searching. Instead of having to search for a program by title, a user can search a set or tree of hierarchies and find the program without knowing the title.

The various translations 716, 718, 720, 722, 724 of text fields (e.g., program title) optional sub-elements, and/or attributes may also be associated with program information 406 and schedule information 408. If information about a program is available in more than one language, additional program translations can be assigned to a program's unique "program ID" number to accommodate the various languages.

Schedule information 408 can include the program key (ID) reference, the channel key (ID) reference, a start time, and a duration in seconds, and can map programs to channels by means of the program ID reference, the channel ID reference, and the start time. Like program information 406, schedule information 408 can be expanded with even more optional sub-elements and/or attributes than illustrated.

Schedule flags 704 are similar to program flags 702 but exist for specific airings of a program. Thus, a schedule flag 704 is a Boolean mechanism used to express general attributes of an airing when the domain of possible values that the attribute can assume is small, e.g., "closed captioned" which is either true or false. Any number of Boolean schedule flags 704 may be assigned to a schedule entry in the schedule information 408. Some examples include: U.S. "Vchip" Ratings, U.S. Content Rating, Canadian TV Ratings, Dolby Digital, HDTV, and "Letterbox." A schedule flag 704 may be bound to another schedule flag to indicate, for example, that a given program is in Dolby on Tuesday, but only in regular stereo on Wednesday. Schedule flags 704 may also show the number of parts of a multipart program, or indicate that the program is edited for television. Flag language translation(s) 724 may accompany the schedule flags 704.

Like listings 402, lineups 404 are also expandable via optional sub-elements and attributes, such as lineup type, tuner position, channels per tuner position, and geographical and/or geopolitical areas, which will now be described.

Lineup types include analog lineup (used for terrestrial broadcast, digital and analog cable), analog satellite (used for large format analog satellite), DVB, ATSC, and "unmapped" (used for any of the above types when the provider cannot provide tuning information). Areas define the availability of lineups (headends, viz sets of channels) in specific geographical and/or geopolitical areas.

Tuner positions are optional data elements assigned to channels in a lineup. Tuner position data elements represent information used to tune the receiver to the specified channel. This data is generally applicable only in situations where the receiver supports tuning by number (frequency). In many countries televisions are equipped with radio button style channel selectors that must be configured by the user prior to use (this is similar to old styles of video cassette recorders with "per channel" tuning). An expansion of tuner position is "channels per tuner position" data elements, i.e., more than one channel source occupying a tuner position. These are usually of two types: scheduled and non-scheduled. Scheduled scenarios include programming during primetime followed by a switch to adult programming after a specified time. Non-scheduled means that two or more channels occupy the same tuner position and either could be on at a given time, for example, in the case of PPV channels running free previews on top of paid programming.

GLF Methods

FIG. 8 shows an exemplary method 800 for formatting programming data according to the teachings of the subject matter. This method 800 can be performed by a module, such as the exemplary GLF data file engine 201 shown in FIGS. 2-3. In the flow diagram, the operations are summarized in individual blocks. The operations may be performed in hardware and/or as machine-readable instructions (software or firmware) that can be executed by a processor.

At block 802, a first listings element is received. A listings element may be any data or information related to programming content or the scheduling thereof. For example, a listing element can include the program name, episode number, year of creation, cast, acting roles, crew, ratings, category, length, start time, frequency, etc. The GLF, which may be in the form of GLF metadata 300, aims to provide comprehensive programming information, so that a given local distributor receiving a GLF data file 202 has all the information at hand that might be needed to provide programming and EPG information in any degree of desired detail.

At block 804, listings elements and lineup elements associated with the first listings element are received. The GLF, because of its self-referential structure, ensures completeness of data inclusion. If a data element is required but not entered into a linked field, then the GLF data file 202 is considered invalid. Usually, IDPs have the desired or required information needed to "fill out" the GLF on hand, but proprietary file formatting results in missing parts and/or errors.

At block 806, listings and lineup elements are validated. At some point in the process of creating a GLF data file 202, the various elements and attributes being added to a GLF data structure are verified and/or validated with regard to proper form, including use of proper data types. In some implementations, the validation of block 806 could occur late in the process, but most likely implementation check for valid data types and proper form, including data integrity, checksum matching, etc. upon input. In an exemplary manual input implementation, in which listings and lineup elements are input "by hand" or with human supervision via a user interface or a programming environment, an incorrect data type, for example, can be identified and rejected immediately upon attempted insertion into the GLF data structure. In other implementations, incorrectly formatted data fields or content are identified and/or rectified automatically and/or electronically.

At block 808, the associated listings and lineup elements are linked with the first listings element. In other words, a section of a GLF data structure, such as section 520 shown in FIG. 5, is thoroughly filled out with elements and attributes, or at least "required field" sections of the data structure section are filled out.

It should be noted that the interlocks and crosslocks established between various elements of the GLF data structure are logical, not necessarily physical, in nature and so size does not prevent an exemplary large GLF data file 202 from being electronically shipped in parts, for example, in the GLFListings.xsd file 602, the GLFLineup.xsd file 604, and the GLFFundamentals.xsd file 606 pieces shown in FIG. 6.

Exemplary Computing Device

With reference to FIG. 9, the components of computer 900 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 900 typically includes a variety of computer-readable media. Computer-readable media can be any available media that can be accessed by computer 900 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 400. A basic input/output system 933 (BIOS), containing the basic routines that help to transfer information between elements within computer 900, such as during start-up, is typically stored in ROM 931. RAM 400 typically contains data and/or program modules that are immediately accessible to and/or presently being operated on by processing unit 920. By way of example, and not limitation, FIG. 9 illustrates operating system 934, application programs 935, an exemplary GLF data file engine 201, other program modules 936, and program data 937. Although the exemplary GLF data file engine 201 is depicted as software in memory 400, other implementations of an exemplary GLF data file engine 201 can be hardware or combinations of software and hardware.

The computer 900 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface such as interface 950.

The drives and their associated computer storage media discussed above and illustrated in FIG. 9 provide storage of computer-readable instructions, data structures, program modules, and other data for computer 900. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 900 through input devices such as a keyboard 962 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port, or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer may operate in a networked environment using logical connections to one or more remote computers, such as a remote computer 980. The remote computer 980 may be a personal computer, a server, a router, a network PC, a peer device or other common network node, and typically includes many or all of the elements described above relative to computer 900, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets, and the Internet.

When used in a LAN networking environment, the computer 900 is connected to the LAN 971 through a network interface or adapter 970. When used in a WAN networking environment, the computer 900 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 900, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

CONCLUSION

It should be noted that the subject matter described above can be implemented in hardware, in software, or in both hardware and software. In certain implementations, the exemplary system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for a GLF for programming content and EPG information. Although the invention has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention.

The invention claimed is:

1. A method implemented on a computing device by a processor configured to execute instructions that, when executed by the processor, direct the computing device to perform acts comprising:
   formatting multimedia programming information having listing elements and lineup elements according to a global listings format (GLF), the GLF causing each listing element to be validated and linked with associated listings elements and linked with associated validated lineup elements to provide complete and valid programming information for an area;
   receiving a listings element from a first Independent Data Provider;
   receiving associated listings elements and associated lineup elements to link to the listings element from one or more second Independent Data Providers;
   prompting the one or more second Independent Data Providers for the associated listings elements and the associated lineup elements when the associated listings elements and the associated lineup elements are missing, according to the GLF;
   validating the listings element, the associated listings elements, and the associated lineup elements, by the processor, against a predefined schema that enforces referential integrity constraints and required fields on the data representing the listings elements and the lineup elements, the predefined schema including:
      a listings component including:
         schedule information comprising a channel identifier, a start time, and a duration; and
         program information comprising a program identifier and a program name;
      a lineups component including the area, available headends, and a channel lineup per one of the headends, the headends defining a set of channels available at a source, and the area being a region in which a one of the headends exists;
      a common data entity including channels, the common data entity joining the listings component and the lineups component;
      a fundamentals component, including basic data type definitions, that defines a structure of the data in the listings component and the lineups component;
   linking the associated listings elements and the associated lineup elements with the listings element according to the GLF; and
   transferring the formatted multimedia programming information to a local programming distributor;
   wherein the linking includes creating a logical relationship between one of the associated listings elements and one of the associated lineup elements such that presence of the one of the associated listings elements requires presence of the one of the associated lineup elements.

2. The method as recited in claim 1, wherein the area is a geographical and/or geopolitical region.

3. The method as recited in claim 1, wherein the area is a region characterized by specific languages spoken in the region.

4. The method as recited in claim 1, wherein the area is a region characterized by specific multimedia programming channels available in the region.

5. A method for formatting multimedia programming information having listings elements and lineup elements, the method implemented on a computing device by a processor configured to execute instructions that, when executed by the processor, direct the computing device to perform acts comprising:
   creating a global listings format (GLF), wherein the GLF:
      includes a set of editorial instructions for producing and delivering the listings elements and the lineup elements; and
      requires each of the listings elements to be validated and linked with associated validated listings elements and linked with associated validated lineup elements to provide complete and valid programming information for an area;
   receiving a listings element from a data provider;
   receiving, from the data provider, associated listings elements and associated lineup elements to link to the listings element;
   prompting the data provider for the associated listings elements and the associated lineup elements when the associated listings elements and the associated lineup elements are missing, according to the GLF;
   validating the listings element, the associated listings elements, and the associated lineup elements, by the processor, against a predefined schema comprising:
      a listings component including:
         schedule information including a channel identifier, a start time, and a duration; and
         program information including a program identifier and a program name;
      a lineups component including the area, available headends, and a channel lineup per one of the headends, the headends defining a set of channels available at a source, and the area being a region in which one of the headends exists;
      a common data entity including channels, the common data entity joining the listings component and the lineups component; and
      a fundamentals component, including basic data type definitions, that defines a structure of the data in the listings component and the lineups component; and
   linking the associated listings elements and the associated lineup elements with the listings element according to the GLF, the linking including creating a logical relationship between one of the associated listings elements and one of the associated lineup elements such that presence of the one of the associated listings elements requires presence of the one of the associated lineup elements;

wherein each listings element and lineup element is validated if data conforming to the editorial instructions exists for all the linked listings elements and for all the linked lineup elements, the listings elements are data related to a programming content, the lineup elements are data related to sets of channels on which the programming content is implemented, and the lineup elements indicate the area.

6. The method as recited in claim 5, wherein the area is a geographical and/or geopolitical region.

7. The method as recited in claim 5, wherein the area is a region characterized by specific languages spoken in the region.

8. The method as recited in claim 5, wherein the area is a region characterized by specific multimedia programming channels available in the region.

9. A method for formatting multimedia programming information having listings elements and lineup elements to provide complete and valid programming information for an area, the method implemented on a computing device by a processor configured to execute instructions that, when executed by the processor, direct the computing device to perform acts comprising:

defining a global listings format (GLF) in an extensible markup language (XML) that includes (i) an XML schema definition (XSD) for producing the listings elements and the lineup elements compliant with the XML XSD, (ii) one or more keys and keyref constraints, and (iii) a requirement that data conforming to the schema to exist for all listings elements and for all lineup elements;

receiving a listings element from a data provider;

receiving, from the data provider, associated listings elements and associated lineup elements;

prompting the data provider for the associated listings elements and the associated lineup elements to receive a complete set of all the listings elements and the lineup elements associated with the received listings element when the associated listings elements and the associated lineup elements are missing, according to the GLF;

parsing and validating the listings element, the associated listings elements, and the associated lineup elements, by the processor, against the XML XSD, wherein the XML XSD includes:

a listings component including:

schedule information including a channel identifier, a start time, and a duration; and program information including a program identifier and a program name;

a lineups component including the area, available headends, and a channel lineup per one of the headends, the headends defining a set of channels available at a source, and the area being a region in which one of the headends exists;

a common data entity including channels, the common data entity joining the listings component and the lineups component; and a fundamentals component including basic data type definitions that defines a structure of the data in the listings component and the lineups component;

linking the associated listings elements and the associated lineup elements with the listings element according to the GLF by using XML XSD keys and keyref constraints, the linking including creating a logical relationship between one of the associated listings elements and one of the associated lineup elements such that presence of the one of the associated listings elements requires presence of the one of the associated lineup elements; and prompting the data provider for the associated listings elements and the associated lineup elements to enable parsing and validation showing conformance with the XML XSD when the associated listings elements and the associated lineup elements are not parsed and validated, according to the GLF;

prompting the data provider for the associated listings elements and the associated lineup elements to complete the linking when the associated listings elements and the associated lineup elements are not linked, according to the GLF;

wherein the listings elements include at least one of a program title, a unique program ID, an episode title, an episode number, a description, a year of creation, a cast, an acting role, a crew, a rating, a category, a length, a start time, or a frequency, and the lineup elements include at least a channel and a location information for the area.

10. The method as recited in claim 9, wherein the area is a geographical and/or geopolitical region.

11. The method as recited in claim 9, wherein the area is a region characterized by specific languages spoken in the region.

12. The method as recited in claim 9, wherein the area is a region characterized by specific multimedia programming channels available in the region.

* * * * *

UNITED STATES PATENT AND TRADEMARK OFFICE
CERTIFICATE OF CORRECTION

| | | |
|---|---|---|
| PATENT NO. | : 7,913,279 B2 | Page 1 of 1 |
| APPLICATION NO. | : 10/356694 | |
| DATED | : March 22, 2011 | |
| INVENTOR(S) | : Andrew M. Simms et al. | |

It is certified that error appears in the above-identified patent and that said Letters Patent is hereby corrected as shown below:

In column 1, line 5, below "title" insert -- COMPUTER PROGRAM LISTING --.

Signed and Sealed this
Twenty-sixth Day of July, 2011

David J. Kappos
*Director of the United States Patent and Trademark Office*